United States Patent
Yamamoto et al.

(10) Patent No.: US 9,337,491 B2
(45) Date of Patent: May 10, 2016

(54) ELECTRODE FOR A LITHIUM BATTERY AND LITHIUM BATTERY

(75) Inventors: Ryuji Yamamoto, Tokyo (JP); Yuusuke Yamada, Tokyo (JP); Takeshi Nakamura, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 471 days.

(21) Appl. No.: 13/397,344

(22) Filed: Feb. 15, 2012

(65) Prior Publication Data

US 2012/0214070 A1 Aug. 23, 2012

Related U.S. Application Data

(60) Provisional application No. 61/444,662, filed on Feb. 18, 2011.

(30) Foreign Application Priority Data

Feb. 16, 2011 (JP) .................................. 2011-031339

(51) Int. Cl.

| | |
|---|---|
| *H01M 4/583* | (2010.01) |
| *H01M 4/62* | (2006.01) |
| *H01M 4/485* | (2010.01) |
| *H01M 10/052* | (2010.01) |
| *B82Y 30/00* | (2011.01) |
| *H01M 4/139* | (2010.01) |

(52) U.S. Cl.
CPC ............... *H01M 4/625* (2013.01); *B82Y 30/00* (2013.01); *H01M 4/485* (2013.01); *H01M 4/623* (2013.01); *H01M 10/052* (2013.01); *H01M 4/139* (2013.01); *Y02E 60/122* (2013.01)

(58) Field of Classification Search
CPC .... B82Y 30/00; B82Y 40/00; C01B 2202/36; C01B 31/0226; D01F 9/127; H01M 10/052; H01M 4/13; H01M 4/139; H01M 4/625; Y02E 60/122; Y02P 70/54
See application file for complete search history.

(56) References Cited

U.S. PATENT DOCUMENTS

| | | | |
|---|---|---|---|
| 7,390,593 B2 * | 6/2008 | Yamamoto | ............... B01J 20/20 252/502 |
| 2007/0202410 A1 | 8/2007 | Takeuchi et al. | |
| 2009/0181304 A1 * | 7/2009 | Miyamoto | .......... C23C 14/3414 429/218.1 |
| 2010/0075229 A1 * | 3/2010 | Atsuki et al. | ................ 429/231.8 |
| 2012/0171566 A1 * | 7/2012 | Yoshitake et al. | ............. 429/209 |

FOREIGN PATENT DOCUMENTS

| | | |
|---|---|---|
| JP | 2005-019399 A | 1/2005 |
| JP | 2006-86116 A | 3/2006 |
| JP | 2007-226967 A | 9/2007 |
| JP | 2009-016265 A | 1/2009 |
| JP | 2010-031214 | 2/2010 |
| JP | 2010-238575 A | 10/2010 |
| WO | WO 2006/019148 A1 | 2/2006 |
| WO | 2010/113884 A1 | 10/2010 |

OTHER PUBLICATIONS

International Search Report and International Preliminary Report from the Japanese Patent Office issued in corresponding Application No. PCT/JP2012/053466.

* cited by examiner

*Primary Examiner* — Carlos Barcena
(74) *Attorney, Agent, or Firm* — Sughrue Mion, PLLC (57) ABSTRACT

An electrode for a lithium battery, which electrode includes an electrode active material which can charge and discharge lithium ions (A), a carbonaceous conductive additive (B) and a binder (C). The carbonaceous conductive additive contains carbon fiber, the carbon fiber including a mixture of two kinds of carbon fibers having different diameter distributions on a number basis; and the fiber diameter distribution of the carbon fiber in the electrode has one or more maximum values at 5-40 nm and at 50-300 nm, respectively. Also disclosed is a lithium battery using the electrode. The electrode enables production of a lithium battery having a reduced discharge capacity decline.

8 Claims, 3 Drawing Sheets

Fig. 5

ELECTRODE FOR A LITHIUM BATTERY AND LITHIUM BATTERY

CROSS-REFERENCE TO RELATED APPLICATIONS

This application claims the benefit of U.S. Provisional Application No. 61/444,662 filed Feb. 18, 2011 and Japanese Patent Application No. 2011-031339 filed Feb. 16, 2011, the above applications incorporated herein by reference in their entirety.

BACKGROUND OF THE INVENTION

1. Field of the Invention

The present invention relates to an electrode for a lithium battery and a lithium battery using the electrode.

2. Description of the Related Art

Since a secondary lithium ion battery has a higher energy density and lighter weight compared to a conventional secondary battery, it has been widely used as a power source for portable electronic devices which is reduced in size and becomes increasingly sophisticated. Also, using a secondary lithium battery as power source for power tools and as a battery for electric vehicles has been studied in recent years.

With respect to a power source for power tools and a battery for electric vehicles, various efforts have been made to improve the large current characteristics, for example, to reduce the resistance in the electrode when a large current is passed therethrough.

Patent Document 1 discloses a negative electrode material in which a granulated graphitic material is coated by and integrated with a fibrous graphite material through the intermediary of a low crystallinity graphitic material. When focused on one negative electrode particle, the circumference of a granulated graphitic material is surrounded by a fibrous graphite material and a coating of another carbon material is formed thereon. This keeps the granulated graphitic material and the fibrous graphite material tightly adhered to each other. However, when the powder is taken as a whole, it is difficult to reduce the electrode resistance as expected. This is because contact between the negative electrode materials is due to contact between low crystallinity graphitic materials.

Patent Document 2 discloses an invention for reducing the internal resistance of a battery by mixing fine carbon fibers into the positive electrode material. This invention poses a problem in that the mixing of fine carbon fibers which generally have a lower bulk density than the positive electrode material reduces the packing density of the electrode. This results in a decrease in capacitance and degradation of the load characteristics of the battery.

Patent Documents

[Patent Document 1] JP-A-2005-019399
[Patent Document 2] JP-A-2007-226967
[Patent Document 3] JP-A-2006-086116 (WO 2006/019148)
[Patent Document 4] JP-A-2009-016265

SUMMARY OF THE INVENTION

An object of the present invention is to provide an electrode for a lithium battery having excellent battery characteristics such as large current characteristics and to provide a lithium battery using the electrode.

As a result of intensive studies, the present inventors found that a battery can exhibit excellent battery characteristics by incorporating two specific kinds of carbon fibers as a carbonaceous conductive additive for the electrode, and in this manner achieved the present invention. That is, the present invention provides an electrode for a lithium battery and a lithium battery comprising the electrode as a constituent element as follows.

(1) An electrode for a lithium battery, which electrode comprises an electrode active material which can charge and discharge lithium ions (A), a carbonaceous conductive additive (B) and a binder (C), wherein the carbonaceous conductive additive contains carbon fiber, said carbon fiber comprising a mixture of two kinds of carbon fibers having different diameter distributions on a number basis; and the fiber diameter distribution of the carbon fiber in the electrode has one or more maximum values at 5-40 nm and at 50-300 nm, respectively.

(2) The electrode for a lithium battery as described in (1) above, wherein the two kinds of carbon fibers comprise a carbon fiber (B1), wherein filaments of the carbon fiber (B1) having a fiber diameter falling within a range of 50 to 300 nm account for 90% or more in the fiber diameter distribution on a number basis, and a carbon fiber (B2), wherein filaments of the carbon fiber (B2) having a fiber diameter falling within a range of 5 to 40 nm account for 90% or more in the fiber diameter distribution on a number basis.

(3) The electrode for a lithium battery as described in (1) or (2) above, wherein a content of the electrode active material (A) is 85 mass % or more and 95 mass % or less, a content of the carbonaceous conductive additive (B) is 2 mass % or more and 10 mass % or less, and the binder content is 3 mass % or more and 5 mass % or less, each based on the mass of the electrode.

(4) The electrode for a lithium battery as described in any one of (1) to (3) above, wherein a blending ratio (B2)/{(B1)+(B2)} of the carbon fiber (B2) to the sum of the carbon fiber (B1) and the carbon fiber (B2) present in the electrode is 5 mass % or more and 20 mass % or less.

(5) The electrode for a lithium battery as described in any one of (1) to (4) above, wherein the carbonaceous conductive additive comprises two kinds of carbon fibers (B1) and (B2) having different fiber diameter distributions on a number basis and carbon black (B3).

(6) The electrode for a lithium battery as described in (5) above, wherein a blending ratio {(B1)+(B2)}/{(B1)+(B2)+(B3)} of the two kinds of carbon fibers (B1) and (B2) and carbon black (B3) present in the electrode is 20 mass % or more and 50 mass % or less.

(7) An electrode for a lithium battery, which electrode comprises an electrode active material which can charge and discharge lithium ions (A), a carbonaceous conductive additive (B) and a binder (C), wherein the carbonaceous conductive additive contains carbon fiber; a fiber diameter distribution of the carbon fiber on a number basis has one or more maximum values at 5-40 nm and at 50-300 nm, respectively; and filaments of the carbon fiber having a fiber diameter falling within a range of 5 to 40 nm and 50 to 300 nm account for 90% or more in the fiber diameter distribution on a number basis.

(8) The electrode for a lithium battery as described in (7) above, wherein the carbon fiber having a fiber diameter falling within a range of 5 to 40 nm and the carbon fiber having a fiber diameter falling within a range of 50 to 300 nm are designated as (b1) and (b2), respectively; and the mass ratio (b2)/(b1+b2) of the carbon fiber (b2) to the sum of the carbon fiber (b1) and the carbon fiber (b2) present in the electrode is 5 mass % or more and 20 mass % or less.

(9) The electrode for a lithium battery as described in (7) or (8) above, wherein the content of the electrode active material (A) is 85 mass % or more and 95 mass % or less, the content of the carbonaceous conductive additive (B) is 2 mass % or more and 10 mass % or less, and the binder content is 3 mass % or more and 5 mass % or less, each based on the mass of the electrode.

(10) The electrode for a lithium battery as described in any one of (7) to (9) above, wherein the carbonaceous conductive additive comprises the carbon fiber and carbon black.

(11) The electrode for a lithium battery as described in (10) above, wherein the carbon fiber having a fiber diameter falling within a range of 50 to 300 nm, the carbon fiber having a fiber diameter falling within a range of 5 to 40 nm and carbon black are designated as (b1), (b2) and (B3), respectively; and the mass ratio of $\{(b1)+(b2)\}/\{(b1)+(b2)+(B3)\}$ present in the electrode is 20 mass % or more and 50 mass % or less.

(12) The electrode for a lithium battery as described in any one of (1) to (11) above, wherein the electrode active material (A) is an electrode active material for a positive electrode and comprises a lithium-containing metal oxide which can charge and discharge lithium ions.

(13) The electrode for a lithium battery as described in any one of (1) to (11) above, wherein the electrode active material (A) is an electrode active material for a negative electrode and comprises a lithium-containing metal oxide which can charge and discharge lithium ions.

(14) A lithium battery comprising the electrode for a lithium battery described in any one of (1) to (13) above as a constituent element.

EFFECTS OF THE INVENTION

A lithium battery having excellent battery characteristics such as large current characteristics can be obtained using an electrode for a lithium battery comprising carbon fiber having a specific fiber diameter distribution as a carbonaceous conductive additive to thereby suppress a decrease in the discharged capacity.

DETAILED DESCRIPTION OF THE INVENTION

The invention will now be described in detail by reference to the drawings. However, the present invention should not be construed as being limited thereto.

[1] Electrode for a Lithium Battery

The electrode for a lithium battery of the present invention comprises an electrode active material which can charge and discharge lithium ions (A), a carbonaceous conductive additive (B) and a binder (C), and may be either a positive electrode or a negative electrode. The lithium battery in the present invention means a lithium secondary battery.

(1) Electrode Active Material (A)

In the present invention, electrode active material (A) may be applicable to either an electrode for a positive electrode (positive electrode active material) or an electrode for a negative electrode (negative electrode active material) by appropriately selecting constituent materials.

<Positive Electrode Active Material>

Arbitrary one or more members of the conventional materials known as a positive electrode active material in a lithium battery (a material which can charge and discharge lithium ions) may be appropriately selected and used as the positive electrode active material. Among such materials, preferred is a lithium-containing metal oxide which can charge and discharge lithium ions.

Examples of the lithium-containing metal oxide include a complex oxide containing lithium and at least one element selected among Co, Mg, Cr, Mn, Ni, Fe, Al, Mo, V, W, Ti, etc.

The mass median particle diameter (D50) of the positive electrode active material is preferably 10 µm or less. With the mass median particle diameter exceeding 10 µm, the charge-discharge reaction efficiency may decrease at a large current. The mass median particle diameter is more preferably 8 µm or less, and still more preferably, 7 µm or less.

The lower limit of the mass median particle diameter is preferably 50 nm or more. With the average particle diameter of less than 50 nm, the packing density of the electrode produced thereof may decrease, which may lead to a problem such as decrease in the capacitance. The lower limit of the mass median particle diameter is more preferably 60 nm.

<Negative Electrode Active Material>

One or more members of the conventional materials known as a negative electrode active material in a lithium battery (a material which can charge and discharge lithium ions) may be appropriately selected and used as the negative electrode active material. For example, as a material which can charge and discharge lithium ions, a carbon material, either of Si or Sn, or alloy and oxides containing at least one of a carbon material, Si and Sn may be used. Among these, a carbon material is preferable.

Typical examples of the above-mentioned carbon material include natural graphite, artificial graphite produced by the heat treatment of petroleum-based cokes and coal-based cokes, hard carbon obtained by carbonizing resin, and mesophase pitch-based carbon materials. In the case of using natural graphite and artificial graphite, preferred is the graphite having d(002), a planar spacing between (002) faces, of from 0.335 to 0.337 nm in the graphite structure as measured by powder X-ray diffraction method from the viewpoint of increasing the battery capacity.

Using alloy containing at least one member of Si and Sn other than a carbon material as a negative electrode active material is advantageous in that the capacitance can be reduced compared to the case of using each of Si and Sn singly and the case of using an oxide of each of Si and Sn. Among these, Si-based alloy is preferable.

The average particle diameter of the negative electrode active material is preferably 10 µm or less. When the average particle diameter exceeds 10 µm, it may decrease the charge-discharge reaction efficiency at a large current. The average particle diameter is more preferably 0.1 to 10 µm, and still more preferably 1 to 7 µm.

The content of the electrode active material (A) in an electrode is preferably from 85 mass % to 95 mass %. When the content of the electrode active material (A) is less than 85 mass %, it leads to decrease in the battery capacity, which is not desirable. When the content of the electrode active material (A) exceeding 95 mass %, it lowers the conductivity and makes the electrode breakdown due to the volume change during charge and discharge more likely, which is not desirable.

(2) Carbonaceous Conductive Additive (B)

Carbonaceous conductive additive (B) used in the present invention contains two kinds of carbon fibers each having a different fiber diameter distribution. As used herein, the description "two kinds" as it relates to carbon fibers means two or more kinds of carbon fibers. The method for confirming whether the conductive additive contains two kinds of carbon fibers having different fiber diameter distributions is not particularly limited, and either of the following methods can be employed. There is no need to make accurate measurements in both of method 1 and method 2. It is possible to confirm whether the conductive additive contains two kinds of carbon fibers having different fiber diameter distributions by either one of the methods.

(Method 1) Observation by Electron Microscopy

Since carbon fibers having a fiber diameter of about 50 to 300 nm can be observed at about 10,000-fold magnification by a scanning electron microscope, the fiber diameter can be measured. On the other hand, it is not possible to focus the microscope on carbon fibers having a fiber diameter of 40 nm or less at about a 10,000-fold magnification, but the carbon fiber diameter of 40 nm or less can be measured by observation under a microscope at a 100,000-fold or more magnification. Therefore, it is possible to observe the conductive additive by changing the magnification of the scanning electron microscope to thereby confirm whether the conductive additive contains two kinds of carbon fibers having different fiber diameters or not. Also, the abundance ratio of the two kinds of carbon fibers can also be measured by the method as described below.

(Method 2) Measurement of Oxidation Onset Temperature

Since the oxidation onset temperature is different with respect to the carbon fibers having different fiber diameters, if there are two or more temperatures where the mass decrease starts in the measurement by a thermobalance in air atmosphere, it means that the conductive additive contains two kinds of carbon fibers having different fiber diameter distributions. The larger specific surface area of the carbon fiber, the higher the surface energy of the carbon fiber, and it lowers the oxidation onset temperature.

For example, while the carbon fiber having a fiber diameter of about 50 to 300 nm has an oxidation onset temperature within the range of from 550 to 700° C., the carbon fiber having a fiber diameter of 40 nm or less has an oxidation onset temperature within the range of from 400 to 550° C.

In the present specification, the fiber diameter of the carbon fiber to be used can be measured by electron microscope observation. Specifically, the fiber diameter distribution of the carbon fiber having a fiber diameter of about 50 nm or more is evaluated by observing the carbon fiber at a 20,000-fold or more magnification under a scanning electron microscope and measuring 100 or more fiber filaments. The fiber diameter distribution of the carbon fiber having a fiber diameter of about 50 nm or less is evaluated by observing the carbon fiber at a 100,000-fold or more magnification under a transmission electron microscope and measuring 100 or more fiber filaments.

<Carbon Fiber (B1)>

The carbon fiber (B1) is preferably the carbon fiber, wherein filaments of the carbon fiber having a fiber diameter falling within a range of 50 to 300 nm account for 90% or more in the fiber diameter distribution (on a number basis), and more preferably, the carbon fiber, wherein filaments of the carbon fiber having a fiber diameter falling within a range of 70 to 200 nm account for 90% or more in the fiber diameter distribution (on a number basis). For example, the carbon fiber synthesized by the floating catalyst method can be used. The floating catalyst method is a method for obtaining the carbon fiber by introducing a raw material liquid in which ferrocene and a sulfur compound as a catalyst source are dissolved in benzene as a carbon source or a gas which gasified the liquid into a flow reactor furnace heated to 1000° C. or higher using a carrier gas such as hydrogen. Generally, hollow tubes are formed from the catalyst metal in the initial stage of the reaction and an approximate length of the carbon filament is determined. Subsequently, thermally-decomposed carbon is deposited on the surface of the hollow tubes and the growth of the fiber in a radial direction proceeds, which forms a growth ring-like structure of carbon. Accordingly, the carbon fiber diameter can be adjusted by controlling the deposit amount of the thermally-decomposed carbon on the carbon fiber during the reaction: i.e. the reaction time, the concentration of the raw material in the reactor and the reaction temperature.

Carbon fiber (B1) obtained by the reaction has low conductivity since it is covered by the low crystallinity thermally-decomposed carbon. Therefore, it is preferable to subject the carbon fiber to graphitization treatment at 2000 to 3500° C. subsequent to the heat treatment at 800 to 1500° C. under an inert gas atmosphere such as argon so as to make the crystallinity of the carbon fiber higher. The graphitization treatment enables evaporative removal of the catalyst metal at the same time and making the carbon fiber to have high purity.

With respect to carbon fiber (B1) obtained by the heat treatment, it is possible to adjust the fiber length by a pulverizer and to break off the branches of the branched carbon fiber.

When the rate of the fiber filaments having a diameter of more than 300 nm increases in carbon fiber (B1) and filaments of the carbon fiber having a fiber diameter falling within a range of 50 to 300 nm account for less than 90% in the fiber diameter distribution, the number of the fiber filaments per unit mass decreases, which makes it difficult to bring the electrode active material into contact with each other uniformly. On the other hand, when the rate of the fiber filaments having a diameter of less than 50 nm increases and filaments of the carbon fiber having a fiber diameter falling within a range of 50 to 300 nm account for less than 90% in the fiber diameter distribution, fiber aggregates of 100 μm or more are formed due to high aggregability of fine fiber filaments, which lowers dispersibility.

The BET specific surface area of carbon fiber (B1) is preferably 6 to 40 $m^2/g$, more preferably 8 to 25 $m^2/g$, and still more preferably 10 to 20 $m^2/g$.

The aspect ratio of carbon fiber (B1) is preferably 20 to 150, more preferably 40 to 120, and still more preferably 50 to 100.

The aspect ratio is calculated by dividing the fiber length of the carbon fiber by the fiber diameter of the carbon fiber. For measuring of the fiber length, the end-to-end length of the fiber is measured on the fiber, the diameter of which was measured by a scanning electron microscope, by changing the magnification of the microscope to 5,000 fold to thereby take a panoramic image. When the aspect ratio of the carbon fiber is less than 20, a large amount of the carbon fiber needs to be added in order to form conductive paths, which decreases the ratio of the electrode active material in the electrode as a result and makes it harder to obtain a sufficient capacitance. On the other hand, when the aspect ratio exceeds 150, it generally makes it easier to form conductive paths by the contact of the fibers with each other, but at the same time it makes the fibers easily entangle with each other and difficult to be dispersed.

The $C_0$ value of carbon fiber (B1) is preferably from 0.676 to 0.678 nm. In the case of the carbon fiber grown by the thermal decomposition of the hydrocarbon, when the $C_0$ value exceeds 0.678 nm, good conductivity cannot be attained in some cases.

<Carbon Fiber (B2)>

Carbon fiber (B2) is the carbon fiber, wherein the filaments of the carbon fiber having a fiber diameter falling within a range of 5 to 40 nm account for 90% or more in the fiber diameter distribution (on a number basis). Examples of carbon fiber (B2) include the carbon fiber synthesized by supplying a catalyst in which metal or a metal oxide is supported on an inorganic support; hydrocarbon such as ethylene; and a carrier gas such as hydrogen, nitrogen and argon at a relatively low temperature of 500 to 800° C. The method requires a reaction time of several minutes to several hours due to the low reaction temperature. Therefore, a fluidized-bed, moving-bed or fixed-bed reactor is used.

The method is characterized in that fine fibers having a relatively high crystallinity precipitated from the catalyst metal can be efficiently obtained because the reaction temperature is low and there is no fiber diameter growth due to the thermal decomposition of hydrocarbon. Depending on the combination of the metal and a support to be used for the catalyst, a tubular-, herringbone- or platelet-structured carbon fiber can be obtained. From the viewpoint of the conductivity and physical strength, carbon fiber having a tubular structure is preferable.

It is desirable to remove the catalyst metal and support from the fiber (B2) obtained by the reaction by the high temperature treatment at 2000 to 3500° C. under an inert atmosphere or by washing with acid such as nitric acid and hydrochloric acid.

Since the fiber grows starting from the catalyst particles in carbon fiber (B2) obtained by the reaction, adjacent fibers are entangled tightly and difficult to be dispersed in some cases. In view of the dispersibility, it is possible to perform the pulverization treatment by a pulverizer, Bantam mill, jet mill and the like.

The BET specific surface area of carbon fiber (B2) is preferably 50 to 380 m²/g, more preferably 100 to 340 m²/g, and still more preferably 150 to 280 m²/g.

The aspect ratio of the carbon fiber is preferably 150 or more.

The aspect ratio is calculated by dividing the fiber length of the carbon fiber by the fiber diameter of the carbon fiber. For measuring of the fiber length, the fiber, the diameter of which was measured by a transmission electron microscope, is observed at 100,000-fold or more magnification. Since the carbon fiber has a very high aspect ratio, specific fiber is taken as the representative value.

Since carbon fiber (B2) has a small fiber diameter, the aspect ratio of 150 or more makes it easier to attain the crosslinking effect between the electrode active materials, and is preferable.

The $C_0$ value of carbon fiber (B2) is preferably from 0.678 to 0.682 nm. In the case of the carbon fiber grown by the catalyst action, when the $C_0$ value is less than 0.682 nm, good conductivity can be attained due to the decrease in the defects and the like contained in the crystals.

<Carbon Black (B3)>

For the carbonaceous conductive additive (B), carbon black materials such as acetylene black, furnace black and Ketjen black can be used. The carbon black material containing a small amount of metal impurities is preferable.

The content of the carbonaceous conductive additive (B) in the electrode is preferably from 2 mass % to 10 mass %. When the content of the carbonaceous conductive additive (B) is less than 2 mass %, it cannot impart sufficient conductivity to the electrode in some cases, which makes the rapid charge and discharge difficult. On the other hand, when the content of the carbonaceous conductive additive (B) exceeds 10 mass %, it decreases the active material content or the binder content, and the former tends to cause the decrease in the battery capacity and the latter tends to cause the decrease in the strength of the electrode.

The blend ratio between carbon fiber (B1) and carbon fiber (B2) contained in the carbonaceous conductive additive: i.e., $\{(B2)\}/\{(B1)+(B2)\}$, is preferably 5 mass % to 20 mass %. When the ratio of the fine carbon fiber (B2) in the total of the carbon fiber is less than 5 mass %, it becomes difficult to form a uniform carbon fiber network throughout the electrode. On the other hand, when the ratio of the fine carbon fiber (B2) in the total carbon fiber exceeds 20 mass %, the fiber filaments become tightly entangled with each other and the dispersibility in the electrode decreases, which may decrease the electrode density, leading to the increase in the internal resistance and the decrease in the capacity.

As a method for observing the carbon fiber contained in the electrode, the cross-section of the electrode can be observed by a scanning electron microscope at a 100,000-fold or more magnification. Or a sample of the electrode prepared by microtome, ion thinning, focused ion beam and the like can be observed by a transmission electron microscope at a 100,000-fold or more magnification. The fiber diameter distribution of the carbon fiber contained in the electrode is determined by measuring 300 or more of the carbon fiber filaments.

The blend ratio between carbon fiber (B1), carbon fiber (B2) and carbon black (B3) contained in a carbonaceous conductive additive: i.e. $\{(B1)+(B2)\}/\{(B1)+(B2)+(B3)\}$ is preferably 20 mass % or more and 50 mass % or less. When the ratio of the carbon fibers contained in the carbonaceous conductive additive is less than 20 mass %, it tends to reduce the effect of imparting conductivity. To the contrary, when the ratio of the carbon fibers contained in the carbonaceous conductive additive exceeds 50%, it tends to cause aggregation due to the entanglement of the fiber with each other and to reduce the effect of imparting conductivity.

The fiber diameter distribution of the carbon fiber (on a number basis) contained in the carbonaceous conductive additive (B) has one or more maximum values at 5-40 nm and at 50-300 nm, respectively; and filaments of the carbon fiber having a fiber diameter falling within a range of 5 to 40 nm and 50 to 300 nm account for 90% or more in the fiber diameter distribution (on a number basis). When the carbon fiber having a fiber diameter falling within a range of 50 to 300 nm and the carbon fiber having a fiber diameter falling within a range of 5 to 40 nm are labeled as (b1) and (b2), respectively, the mass ratio (b2)/(b1+b2) is preferably 5 mass % or more and 20 mass % or less.

When carbon black contained in contained in the carbonaceous conductive additive is labeled as (B3), the mass ratio of $\{(b1)+(b2)\}/\{(b1)+(b2)+(B3)\}$ is preferably 20 mass % or more and 50 mass % or less.

(3) Binder (C)

There is no particular limitation on binder (C) in the electrode forming materials, and the conventionally known materials for the electrode in the lithium battery can be appropriately selected and used. Preferable examples of binder (C) include fluorine-containing polymer such as polyvinylidene difluoride (PVDF), vinylidene fluoride-hexafluoropropylene copolymer, vinylidene fluoride-chlorotrifluoroethylene copolymer and vinylidene fluoride-tetrafluoroethylene copolymer; and styrene-butadiene copolymer rubber (SBR).

The binder (C) content in the electrode is preferably 3 mass % to 5 mass % to the electrode. When the binder content is less than 3 mass % to the electrode, it tends to decrease the electrode strength. On the other hand, when the binder content exceeds 5 mass %, it increases the resistance of the electrode and decrease the conductivity.

(4) Preparation of the Electrode

There is no particular limitation on the method for producing the electrode for the lithium battery of the present invention, and generally, the electrode can be produced by mixing electrode active material (A), carbonaceous conductive additive (B) and binder (C) and then applying the mixture on the support substrate such as metal current collectors, followed by drying and pressing.

Methods for mixing each of the materials include (1) a method of mixing electrode active material (A), carbonaceous conductive additive (B) and binder (C) at one time, (2) a method of mixing electrode active material (A) and carbonaceous conductive additive (B) first and then mixing binder (C), (3) a method of mixing electrode active material (A) and binder (C) first and then mixing carbonaceous conductive additive (B) and (4) a method of mixing carbonaceous conductive additive (B) and binder (C) first and then mixing electrode active material (A).

Since the dispersion state in the electrode differs depending on the kinds, composition ratio and combination of each of the materials and it affects the electrode resistance, liquid-absorbing property and the like, it is necessary to select an optimum mixing method according to conditions.

As a method for mixing the electrode active material and carbonaceous conductive additive, they can be stirred by a mixer and the like. There is no particular limitation on the stirring method, and apparatus such as a ribbon mixer, screw-type kneader, SPARTAN-RYUZER, Loedige Mixer, planetary mixer and all-purpose mixer may be used.

There is no particular limitation on the method for mixing a binder into the mixture, and examples of the method include a method of kneading with a solvent after mixing the electrode active material and carbonaceous conductive additive by a dry method and a method of diluting the binder material with a solvent and kneading the resultant with the electrode active material, carbonaceous conductive additive, or a mixture thereof. These mixtures containing a solvent are applied onto the current collector (substrate) and make it into a sheet. A thickener such as a polymer of CMC (sodium carboxymethyl cellulose), polyethylene glycol and the like may be further added for adjusting the viscosity of the mixture containing a solvent.

There is no particular limitation on the kneading method after the addition of a solvent, and known apparatus such as a ribbon mixer, screw-type kneader, SPARTAN-RYUZER, Loedige Mixer, planetary mixer and all-purpose mixer may be used.

The electrode of the present invention can be manufactured by applying the above kneaded mixture onto the current collector. The mixture after being kneaded can be applied onto the current collector by a known method. Examples of the method include a method of applying the mixture by a doctor blade or a bar coater followed by molding by a roll press.

Known materials such as aluminum, stainless steel, nickel, titanium; alloy thereof; platinum; and carbon sheet can be used for the current collector.

The electrode material applied onto the current collector is dried by a known method and shaped by a known method such as a roll press and pressure press so as to have a desired thickness and density.

Though the pressure for pressing the electrode material cannot be uniformly defined, generally a pressure of 1 ton/$cm^2$ or more is applied. The electrode thickness varies depending on the shape of the intended battery and is not particularly limited but generally 0.5 to 1,000 μm, and more preferably 5 to 500 μm.

[2] Lithium Battery

The electrode for a lithium battery of the present invention can be used as an electrode of non-aqueous secondary battery having high energy density such as an Li ion battery and Li polymer battery. A typical production method of an Li ion battery and/or Li polymer battery is given below but the present invention is not limited thereto.

The electrode produced as above is processed into a desired shape and forms a laminate consisting of cathode sheet/separator/anode sheet so that the anode may not contact the cathode. The thus formed laminate is housed in a container having a shape of coin, rectangular, cylinder or sheet. In a case where some moisture or oxygen may be adsorbed during the laminating and housing steps, the product is again subjected to drying under reduced pressure and/or in an inert atmosphere having a low dew point (−50 ° C. or lower), and transferred into an inert atmosphere having a low dew point. Subsequently, after at least one member of an electrolytic solution and/or polymer solid electrolyte and/or a polymerizable composition is poured into the container, and in the case where a polymerizable composition is poured, an electrolytic solution is allowed to penetrate thereto, and the container is sealed up, to thereby obtain a lithium battery or a lithium polymer battery.

As a separator, a known one may be used. From the viewpoint of thinness and high strength, a microporous film made of polyethylene or polypropylene is preferred. From the viewpoint of ion conduction, the higher the porosity, the more preferable. However, if the porosity is too high, it leads to decrease in strength or causes short circuit between the cathode and the anode. Therefore, the porosity is controlled to be from 30 to 90%, preferably from 50 to 80%. Moreover, with respect to the film thickness, from the viewpoint of ion conduction and battery capacity, the thinner, the more preferable. However, if too thin, it leads to decrease in strength or causes short circuit between the cathode and the anode. Therefore, generally, the thickness is from 5 to 100 μm, preferably 5 to 50 μm. The microporous film can be used in a combination of two or more kinds thereof or a combination of the other separator such as a nonwoven fabric.

As electrolyte solution and electrolyte in non-aqueous secondary battery, especially lithium ion battery and/or lithium polymer battery, a known organic electrolyte solution, inorganic solid electrolyte or solid polymer electrolyte can be used.

Preferred examples of non-aqueous solvents used for the organic electrolyte solution (non-aqueous electrolyte solution) include ethers such as diethylether, dibutylether, ethyleneglycol dimethylether, ethyleneglycol diethylether, ethyleneglycol dibutylether, diethyleneglycol dimethylether, diethyleneglycol diethylether, diethyleneglycol dibutylether, diethyleneglycol dimethylether and ethyleneglycol diphenylether; amides such as formamide, N-methylformamide, N,N-dimethylformamide, N-ethylformamide, N,N-diethylformamide, N-methylacetamide, N,N-dimethyl acetamide, N-ethylacetamide, N,N-diethylacetamide, N,N-dimethylpropion amide and hexamethyl phosphorylamide; sulfur-containing compounds such as dimethyl sulfoxide and sulfolane; dialkylketones such as methylethylketone and methylisobutylketone; cyclic ethers such as ethylene oxide, propylene oxide, tetrahydrofuran, 2-methoxytetrahydrofuran, 1,2-dimethoxyethane and 1,3-dioxolane; carbonates such as ethylene carbonate, butylene carbonate, diethyl carbonate, dimethyl carbonate, methylethyl carbonate, propylene carbonate and vinylene carbonate; γ-butyrolactone; N-methylpyrrolidone; and solutions of organic solvents such as acetonitrile and nitromethane. More preferred are esters such as ethylene carbonate, butylene carbonate, diethyl carbonate, dimethyl carbonate, methylethyl carbonate, propylene carbonate, vinylene carbonate, γ-butyrolactone, ethers such as dioxolane, diethylether and diethoxyethane, dimethyl sulfoxide, acetonitrile and tetrahydrofuran. Particularly preferably, carbonate-base nonaqueous solvent such as ethylene carbonate and propylene carbonate can be used. One of these solvents may be used singly or a mixture of two or more of them may be used.

As solute (electrolyte) in these solvent, lithium salt is used. Examples of generally known lithium salts include, $LiClO_4$, $LiBF_4$, $LiPF_6$, $LiAlCl_4$, $LiSbF_6$, LiSCN, LiCl, $LiCF_3SO_3$, $LiCF_3CO_2$ and $LiN(CF_3SO_2)_2$.

Examples of solid polymer electrolyte include derivatives of polyalkylene oxide such as polyethylene oxide and polypropylene oxide and polymer containing the derivative; and derivative of vinylidene fluoride, hexafluoropropylene, polycarbonate, ester phosphate polymer, polyalkyl imine, polyacrylonitrile, poly(meth)acrylic acid ester, polyphosphazene, polyurethane, polyamide, polyester, polysiloxane and the like, and polymer containing the derivative.

Among the above-mentioned polymer compounds, a compound containing an oxyalkylene, urethane or carbonate structure in a molecule such as polyalkylene oxide, polyurethane and polycarbonate is preferable because it has excellent compatibility with a various polar solvents and excellent electrochemical stability. From the viewpoint of stability, a compound containing a fluorocarbon group in a molecule such as polyvinylidene fluoride and polyhexafluoropropylene is also preferable. These oxyalkylene, urethane, carbonate and fluorocarbon groups may be contained in the same polymer. The number of repeating units of each of these groups may be within a range of 1 to 1000 and preferably a range of 5 to 100.

Choices of members other than the above materials required in battery construction are not limited.

EXAMPLES

The present invention will be described in yet further detail in reference to the following Examples. However, the present invention should not be construed as being limited thereto.
Method for Evaluating Battery
(1) Preparation of a Cell for Lithium Ion Battery Test (Laminate Cell; Positive Electrode)

A laminate cell was prepared as below. The operation described below was performed under dry argon atmosphere at dew point of −80° C. or lower.

A reference electrode (a lithium metal foil), a separator, a working electrode, a separator, a counter electrode (a lithium metal foil) and a separator were laminated on a separator (a microporous film made of polypropylene (manufactured by Celgard Inc., Celgard 2400), 25 μm). The obtained laminate body was wrapped in an aluminum laminate and the three sides thereof were heat-sealed. An electrolytic solution was added thereto and the whole was vacuum sealed and made into a test cell.

(2) Preparation of a Cell for Lithium Ion Battery Test (a Tripolar Cell; Negative Electrode)

A tripolar cell was prepared as follows. The following procedures were conducted under dry argon atmosphere at dew point −80° C. or lower.

In a polypropylene-made cell (inner diameter of about 18 mm) having a screw-in lid, a sample electrode for evaluation (diameter of 16 mm) and a metal lithium foil were sandwiched with separators (polypropylene-made microporous film (Celgard 2400 produced by Celgard Inc.), 25 μm). Further, a metal lithium foil for reference was laminated thereon similarly sandwiching a separator. Electrolyte solution was added thereto to thereby obtain a test cell.
(3) Electrolytic Solution A solution of 1.0 mol/l of $LiPF_6$ as solute dissolved in a solvent as being a mixture of 2 parts by mass of EC (ethylenecarbonate) and 3 parts by mass of EMC (ethylmethylcarbonate) was used as electrolytic solution.
(4) Large-Current Loading Test (Laminate Cell; Evaluation of a Positive Electrode)

CC (constant-current) charging was conducted from the rest potential to 4.2 V at a 0.2 C current. Subsequently, the charging was switched to CV (constant voltage) charging at 2 mV, and stopped at the time point when the current value fell to 12 μA. CC discharging was conducted at respective current densities of 0.2 C and 2.0 C and cut off at a voltage of 2.5 V.

[85] The ratio of the discharge capacity at 2.0 C against the discharge capacity at 0.2 C was defined as a capacity ratio (capacity retention rate in high-rate discharging) and evaluated.

(5) Large-Current Loading Test (Tripolar Cell; Evaluation of a Negative Electrode)

CC (constant-current) charging was conducted from the rest potential to 2 mV at a 0.2 C current. Subsequently, the charging was switched to CV (constant voltage) charging at 2 mV, and stopped at the time point when the current value fell to 12 μA. CC discharging was conducted at respective current densities of 0.2 C and 2.0 C and cut off at a voltage of 1.5 V.

The ratio of the discharge capacity at 2.0 C against the discharge capacity at 0.2 C was defined as a capacity ratio (capacity retention rate in high-rate discharging) and evaluated.

The raw materials and equipment used in Examples and Comparative

Figure 1:
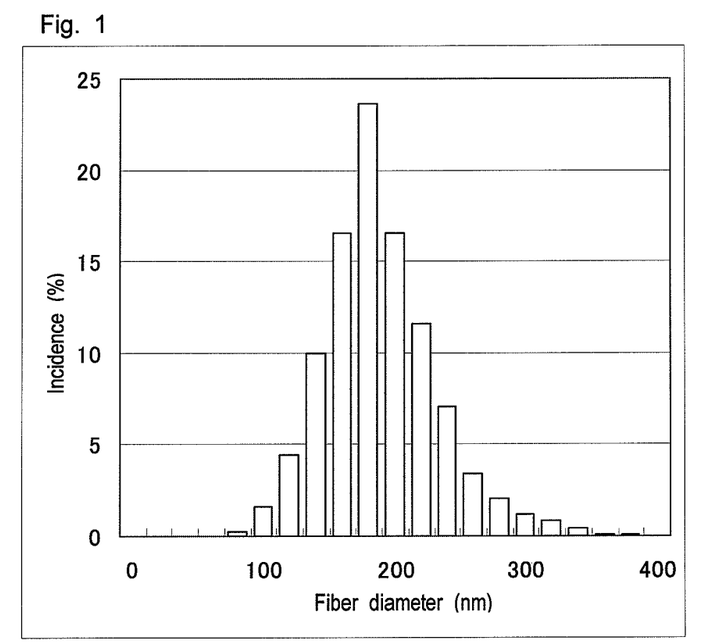
FIG. 1 is a graph showing a fiber diameter distribution of VGCF-H
Figure 2:
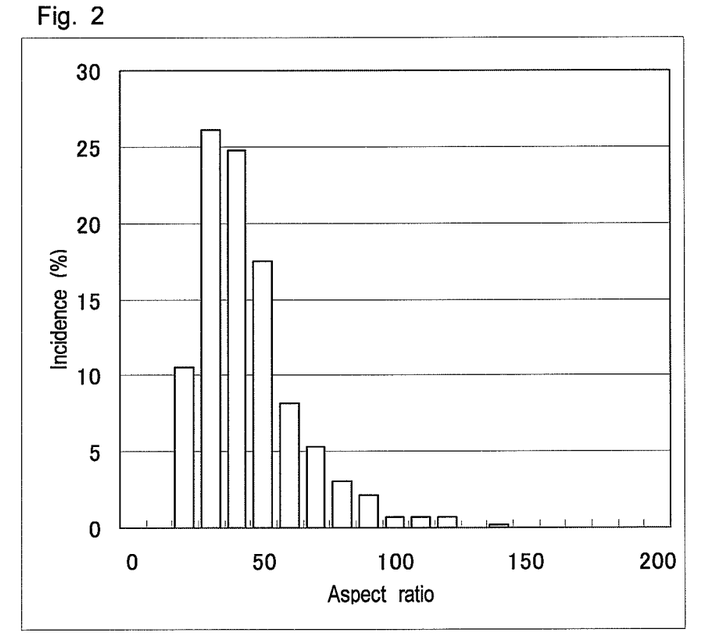
FIG. 2 is a graph showing an aspect ratio distribution of VGCF-H

Examples are described below.
<Positive Electrode Active Material>
LFP-NCO ($LiFePO_4$): produced by Aleees; average particle size: 2 μm
<Negative Electrode Active Material>
MCMB6-28: produced by OSAKA GAS Co., Ltd.; average particle size: 6 μm
<Carbon Fiber (B1)>
VGCF-H: produced by SHOWA DENKO K. K.;
average fiber diameter (by SEM image analysis at a 30,000-fold magnification and 300 of the carbon fiber filaments were measured): 180 nm,
ratio of fiber filaments having a fiber diameter falling within a range of 50 to 300 nm: 98%
average fiber length (by SEM image analysis at a 5,000-fold magnification and 300 of the carbon fiber filaments were measured): 7 μm,
average aspect ratio: 40,
BET specific ratio: 13 $m^2/g$,
tapping density: 0.090 $g/cm^3$,
X-ray $C_0$ (crystallinity of graphite crystals calculated according to the gas the volumetric method by Japan Soc. for the Promotion of Sci. Law): 0.677 nm FIG. 1 and FIG. 2 show the fiber diameter distribution and aspect ratio distribution of VGCF-H.

<Carbon Fiber (B2)>

Figure 3:
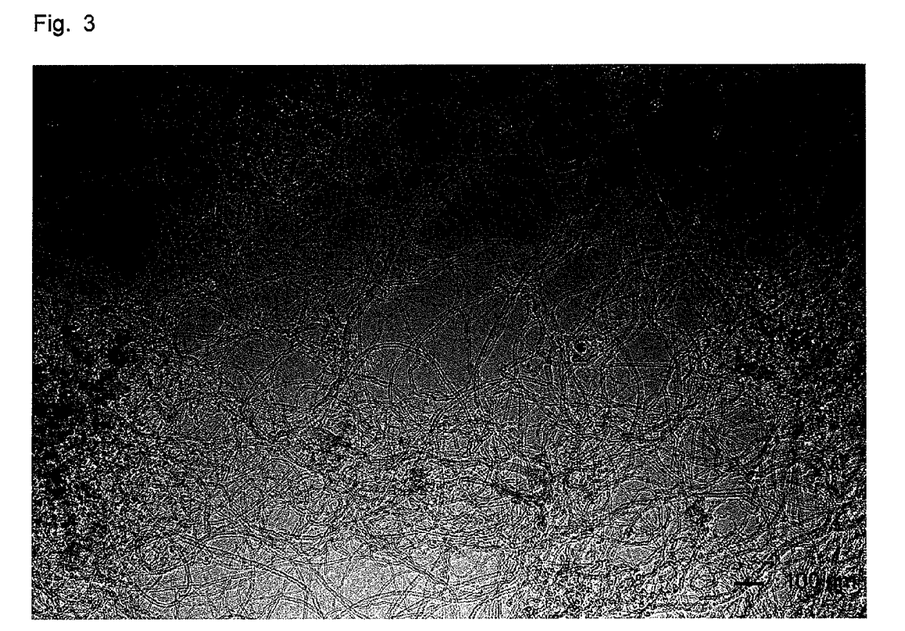
FIG. 3 is a TEM image (120,000-fold magnification) of VGCF-XA
Figure 4:
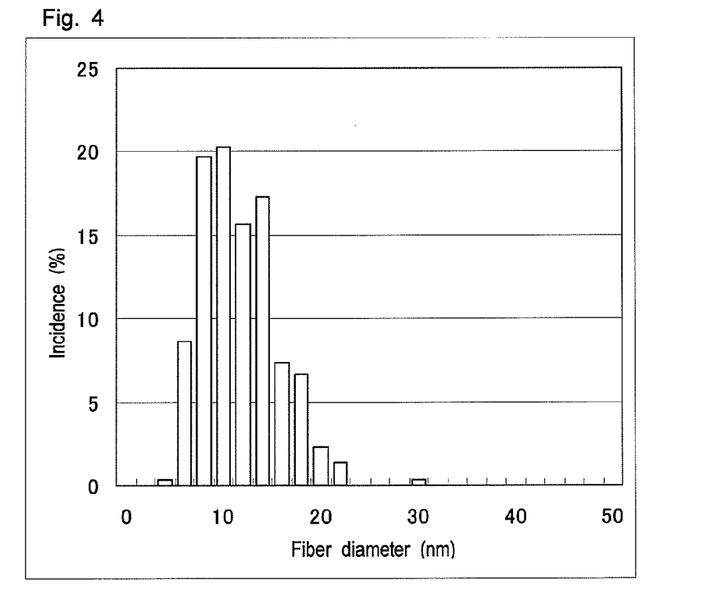
FIG. 4 is a graph showing a fiber diameter distribution of VGCF-XA

VGCF-XA: produced by SHOWA DENKO K. K.;
average fiber diameter (by SEM image analysis at a 120,000-fold magnification and 300 of the carbon fiber filaments were measured): 12 nm,
ratio of fiber filaments having a fiber diameter falling within a range of 5 to 40 nm: 99%
average aspect ratio: 160 or higher,
BET specific ratio: 260 m²/g,
tapping density: 0.025 g/cm³,
X-ray $C_0$: 0.680 nm FIG. 3 and FIG. 4 show the transmission electron microscope (TEM) image and fiber diameter distribution of VGCF-XA.

<Acetylene Black (B3)>

DENKABLACK: produced by Denki Kagaku Kogyo Kabushiki Kaisha

<Binder (C)>

KF-polymer (L#1320): for a positive electrode; and KF-polymer (L#9210): for a negative electrode.

The above KF-polymers contain PVDF in a state of being dissolved in NMP (N-methyl-2-pyrrolidone). Both are produced by KUREHA Corporation.

<Solvent>

NMP: produced by SHOWA DENKO K. K.

<Dry Method Mixer>

Nobilta: produced by Hosokawa Micron Corporation (circumferential velocity: 30-50 m/s)
IKA mixer: produced by Janke & Kunkel GmbH (the maximum number of rotations of the mixing wing: 10,000 rpm (circumferential velocity: 17 m/s)

<Slurry Kneader>

TK-HIVIS MIX f-Model 03: produced by Primix Corporation

Example 1

LFP-NCO, VGCF-H, VGCF-XA and acetylene black were weighed to take out a total amount of 200 g so as to have the mass ratio shown in Table 1, placed in a mixing container of Nobilta (effective volume: 500 ml) and mixed by a dry method for 12 minutes. The circumferential velocity of the mixing wing was set to 40 m/s.

The mixture was moved to TK-HIVISMIX, KF-polymer L#1320 was added thereto so that the solid content of PVDF reaches 4 mass % and the mixture was kneaded. Next, the mixture was kneaded while adding NMP so as to optimize the application viscosity of the mixture.

The obtained slurry was applied onto an aluminum foil using an automatic applier and a doctor blade, and dried on a hot plate (80° C.) for 30 minutes and then in a vacuum dryer (120° C.) for one hour. After drying, the product was stamped out in a determined size, and pressed with a press molding machine (electrode density: 1.89 g/cm³). Subsequently, the product was dried in a vacuum dryer (120° C.) again for 12 hours to thereby obtain a positive electrode sample. The press was performed at a pressing pressure of 5 MPa.

Figure 5:
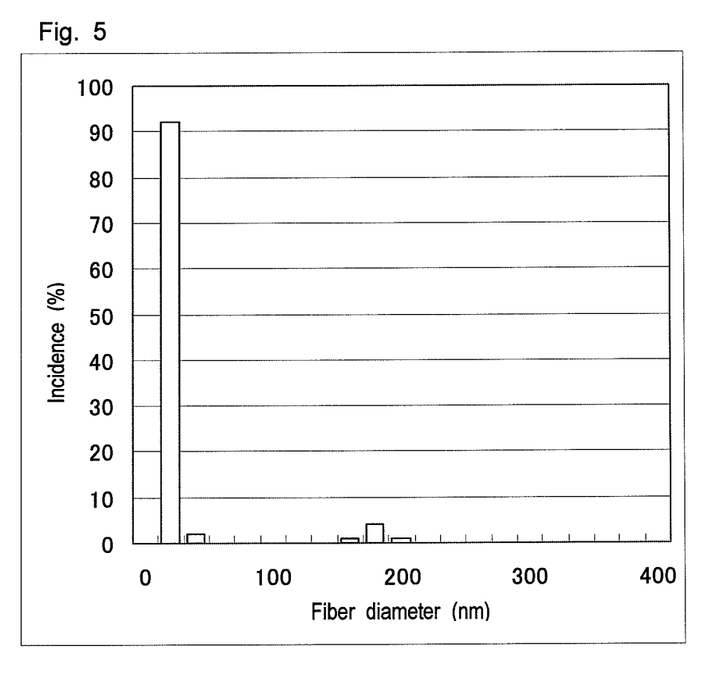
FIG. 5 is a graph showing a fiber diameter distribution of the carbon fiber contained in the electrode of Example 1 (observed samples: 500)

The results of the battery evaluation are shown in Table 1 and a diameter distribution of the carbon fiber in the electrode is shown in FIG. 5.

The fiber diameter distribution of the carbon fiber in the electrode was evaluated by breaking the electrode in liquid nitrogen, processing the fractured surface with gold evaporation and observing 500 or more of fiber filaments in the fractured surface under a scanning electron microscopy at a 100,000-fold or higher magnification.

Example 2

A positive electrode sample (electrode density: 1.92 g/cm³) was produced in the same manner as in Example 1 except for making the mass ratio of LFP-NCO, VGCF-H, VGCF-XA and acetylene black at the time of the dry method mixing as in Table 1 for the evaluation of the battery. The results of the battery evaluation are shown in Table 1.

Example 3

A positive electrode sample (electrode density: 1.88 g/cm³) was produced in the same manner as in Example 1 except for making the mass ratio of LFP-NCO, VGCF-H, VGCF-XA and acetylene black at the time of the dry method mixing as in Table 1 for the evaluation of the battery. The results of the battery evaluation are shown in Table 1.

Example 4

A positive electrode sample was produced in the same manner as in Example 1 except for making the mass ratio of LFP-NCO, VGCF-H, VGCF-XA and acetylene black at the time of the dry method mixing as in Table 1 for the evaluation of the battery. The results of the battery evaluation are shown in Table 1.

Example 5

MCMB6-28, VGCF-H, VFCF-XA and acetylene black were weighed to take out a total amount of 100 g so as to have the mass ratio shown in Table 2, placed in a mixing container of Nobilta (effective volume: 500 ml) and mixed by a dry method for eight minutes. The circumferential velocity of the mixing wing was set to 40 m/s. The mixture was moved to TK-HIVISMIX, KF-polymer L#9210 was added thereto so that the solid content of PVDF reaches 5 mass % and the mixture was kneaded. Next, the mixture was kneaded while adding NMP so as to optimize the application viscosity of the mixture. The obtained slurry was applied onto a copper foil using an automatic applier and a doctor blade, and dried on a hot plate (80° C.) for 30 minutes and then in a vacuum dryer (120° C.) for one hour. After drying, the product was stamped out in a determined size, and pressed with a press molding machine. Subsequently, the product was dried in a vacuum dryer (120° C.) again for 12 hours. The pressing pressure was adjusted so that the final electrode density becomes 1.5 g/cm³. The results of the battery evaluation are shown in Table 2.

Comparative Example 1

A positive electrode sample (electrode density: 1.86 g/cm³) was produced in the same manner as in Example 1 except for making the mass ratio of LFP-NCO, VGCF-H, VGCF-XA and acetylene black at the time of the dry method mixing as in Table 1 for the evaluation of the battery. The results of the battery evaluation are shown in Table 1.

Comparative Example 2

A positive electrode sample (electrode density: 1.87 g/cm³) was produced in the same manner as in Example 1 except for making the mass ratio of LFP-NCO, VGCF-H and acetylene black at the time of the dry method mixing as in Table 1 for the evaluation of the battery. The results of the battery evaluation are shown in Table 1.

Comparative Example 3

A positive electrode sample (electrode density: 1.85 g/cm$^3$) was produced in the same manner as in Example 1 except for making the mass ratio of LFP-NCO, VGCF-XA and acetylene black at the time of the dry method mixing as in Table 1 for the evaluation of the battery. The results of the battery evaluation are shown in Table 1.

Comparative Example 4

A positive electrode sample was produced in the same manner as in Example 1 except for making the mass ratio of LFP-NCO and acetylene black at the time of the dry method mixing as in Table 1 for the evaluation of the battery. The results of the battery evaluation are shown in Table 1.

Comparative Example 5

A negative electrode sample was produced in the same manner as in Example 5 except for making the mass ratio of MCMB6-28 and acetylene black at the time of the dry method mixing as in Table 2 for the evaluation of the battery. The results of the battery evaluation are shown in Table 2.

Comparative Example 6

A negative electrode sample was produced in the same manner as in Example 5 except for making the mass ratio of MCMB6-28 and VGCF-XA at the time of the dry method mixing as in Table 2 for the evaluation of the battery. The results of the battery evaluation are shown in Table 2.

TABLE 1

| | Electrode Active material (A) | Carbonaceous conductive additive (B) | | | Binder (C) | Battery characteristics Discharged capacity (mAH) | | Capacity Ratio |
|---|---|---|---|---|---|---|---|---|
| | Positive Electrode (mass %) | Carbon fiber (B1) (mass %) | Carbon fiber (B2) (mass %) | Acetylene black (mass %) | PVDF (mass %) | 0.2 C | 2 C | |
| Example 1 | 91 | 0.95 | 0.05 | 4 | 4 | 148 | 113 | 76 |
| Example 2 | 91 | 0.90 | 0.10 | 4 | 4 | 151 | 117 | 78 |
| Example 3 | 91 | 0.80 | 0.20 | 4 | 4 | 150 | 113 | 76 |
| Example 4 | 87 | 3.60 | 0.40 | 5 | 4 | 144 | 117 | 81 |
| Comparative Example 1 | 91 | 0.70 | 0.30 | 4 | 4 | 147 | 104 | 71 |
| Comparative Example 2 | 91 | 1.00 | 0 | 4 | 4 | 146 | 102 | 70 |
| Comparative Example 3 | 91 | 0 | 1.00 | 4 | 4 | 146 | 103 | 71 |
| Comparative Example 4 | 91 | 0 | 0 | 5 | 4 | 138 | 83 | 60 |

TABLE 2

| | Electrode Active material (A) | Carbonaceous conductive additive (B) | | | Binder (C) | Battery characteristics Discharged capacity (mAH) | | Capacity Ratio |
|---|---|---|---|---|---|---|---|---|
| | Negative Electrode (mass %) | Carbon fiber (B1) (mass %) | Carbon fiber (B2) (mass %) | Acetylene black (mass %) | PVDF (mass %) | 0.2 C | 2 C | |
| Example 5 | 93 | 0.90 | 0.10 | 1 | 5 | 294 | 280 | 95 |
| Comparative Example 5 | 93 | 0 | 0 | 2 | 5 | 290 | 247 | 85 |
| Comparative Example 6 | 93 | 0 | 2.00 | 0 | 5 | 291 | 256 | 88 |

As can be seen from Table 1, a capacity retention rate of 75% or higher could be maintained by controlling the ratio of the carbonaceous conductive additive (B) in the positive electrode to 5 to 9 mass % and the ratio of the carbon fiber (carbon fiber (B1)+carbon fiber (B2)) in the carbonaceous conductive additive to 20 to 44 mass %.

As can be seen from Table 2, a capacity retention rate of 90% or higher could be maintained by controlling the ratio of the carbonaceous conductive additive (B) in the negative electrode to 2 mass % and the ratio of the carbon fiber (carbon fiber (B1)+carbon fiber (B2)) in the carbonaceous conductive additive to 50 mass %.

The invention has been described in detail by reference to the above embodiments. However, the invention should not construed as being limited thereto. It should further be apparent to those skilled in the art that various changes in form and detail of the invention as shown and described above may be made. It is intended that such changes be included within the spirit and scope of the claims appended hereto.

What is claimed is:

1. An electrode for a lithium battery, which electrode comprises an electrode active material which can charge and discharge lithium ions (A), a carbonaceous conductive additive (B) and a binder (C), wherein the carbonaceous conductive additive contains carbon fiber, said carbon fiber comprising a mixture of two kinds of carbon fibers having different diameter distributions on a number basis; and the fiber diameter distribution of the carbon fiber in the electrode has one or more maximum values at 5-40 nm and at 50-300 nm, respectively,
    wherein the two kinds of carbon fibers comprise a carbon fiber (B1), wherein filaments of the carbon fiber (B1) having a fiber diameter falling within a range of 50 to 300 nm account for 90% or more in the fiber diameter distribution on a number basis, and a carbon fiber (B2), wherein filaments of the carbon fiber (B2) having a fiber diameter falling within a range of 5 to 40 nm account for 90% or more in the fiber diameter distribution on a number basis,
    wherein the carbon fiber (B2) has a tubular structure, and
    wherein the carbon fiber (B2) has an average aspect ratio of 160 or higher.

2. The electrode for a lithium battery as claimed in claim 1, wherein a content of the electrode active material (A) is 85 mass % or more and 95 mass % or less, a content of the carbonaceous conductive additive (B) is 2 mass % or more and 10 mass % or less, and the binder content (C) is 3 mass % or more and 5 mass % or less, each based on the mass of the electrode.

3. The electrode for a lithium battery as claimed in claim 1, wherein the electrode active material (A) is an electrode active material for a positive electrode and comprises a lithium-containing metal oxide which can charge and discharge lithium ions.

4. The electrode for a lithium battery as claimed in claim 1, wherein the electrode active material (A) is an electrode active material for a negative electrode and comprises a material which can charge and discharge lithium ions selected from the group consisting of a carbon material; either of Si or Sn, or an alloy thereof; and oxides containing at least one of a carbon material, Si and Sn.

5. The electrode for a lithium battery as claimed in claim 1, wherein a blending ratio (B2)/{(B1)+(B2)} of the carbon fiber (B2) to the sum of the carbon fiber (B1) and the carbon fiber (B2) is 5 mass % or more and 20 mass % or less.

6. The electrode for a lithium battery as claimed in claim 1, wherein the carbonaceous conductive additive comprises the two kinds of carbon fibers (B1) and (B2) having different fiber diameter distributions on a number basis and carbon black (B3).

7. The electrode for a lithium battery as claimed in claim 6, wherein a blending ratio {(B1)+(B2)}/{(B1)+(B2)+(B3)} of the two kinds of carbon fibers (B1) and (B2) and carbon black (B3) present in the electrode is 20 mass % or more and 50 mass % or less.

8. A lithium battery comprising the electrode for a lithium battery claimed in claim 1 as a constituent element.

* * * * *